FIG. 1

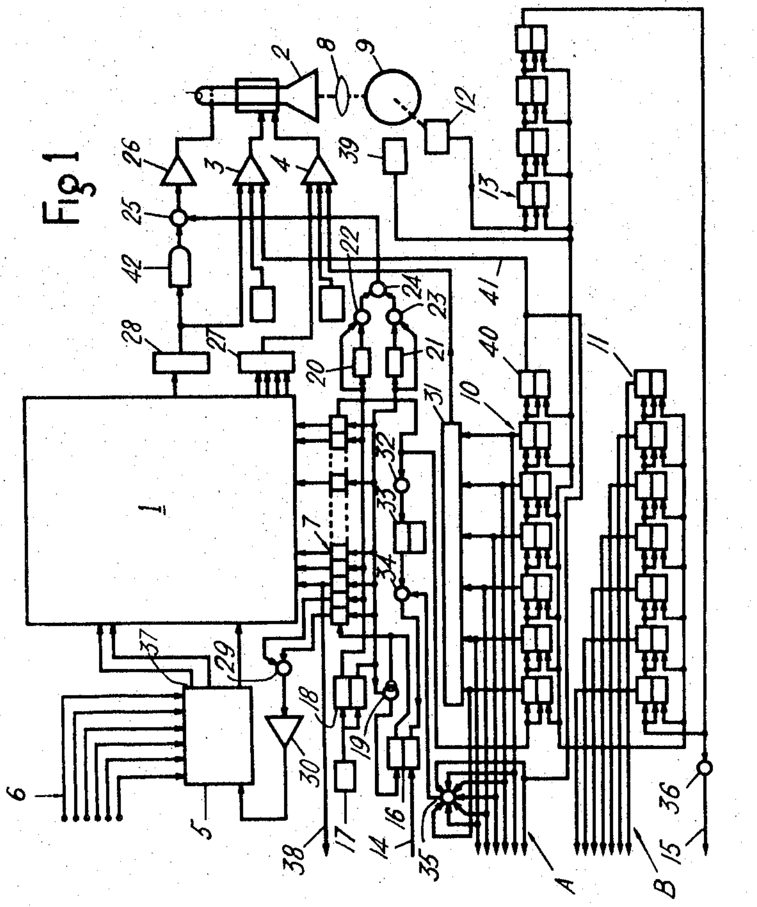

1 SYMBOL GENERATOR
5 SELECTION MATRIX
7 SEQUENTIAL PULSE GEN.
9 XEROGRAPHIC DRUM
10 HOR. DIGITAL REG.
11 VER. DIGITAL REG.
12 PULSE TACHOMETER
13 PULSE COUNTER
16 BISTABLE
17 DOT CLOCK
18 BISTABLE
19 GATE
20 PULSE DELAY CIR.
21 PULSE DELAY CIR.
22 "AND" GATE
23 "AND" GATE
24 "OR" GATE
25 "AND" GATE
27 X "OR" GATE
28 Y "OR" GATE
29 "OR" GATE
31 DIG.-To-ANAL.CONV.
32 PULSE SHAPER
33 MONOSTABLE
34 "AND" GATE
35 "OR" GATE
39 PHOTOCELL PICK-OFF
40 BISTABLE
42 LIMITER

April 11, 1967 K. G. HUNTLEY 3,313,883

RECORDING OF DATA

Original Filed March 31, 1959 5 Sheets-Sheet 3

April 11, 1967 K. G. HUNTLEY 3,313,883

RECORDING OF DATA

Original Filed March 31, 1959 5 Sheets-Sheet 4

United States Patent Office 3,313,883
Patented Apr. 11, 1967

3,313,883
RECORDING OF DATA

Keith Gordon Huntley, Alexandria, Va., assignor to The Rank Organisation Ltd., London, England, a British company Continuation of application Ser. No. 803,210, Mar. 31, 1959. This application June 3, 1963, Ser. No. 286,440
10 Claims. (Cl. 178—15)

This invention relates to a printer of alpha-numeric and other symbols forming, for example, the decoded output of a digital machine, the printer being of the type in which the output is visually displayed and optically projected upon a moving light sensitive recording surface.

The present application is a continuation of my copending application, Ser. No. 803,210, filed Mar. 31, 1959, now abandoned.

Alpha numeric and other symbols and line patterns generally are hereinafter referred to as characters.

It has been proposed to display the output of a digital machine in decoded alpha-numeric form upon the screen of a cathode ray tube and to project the display by optical means upon a rotating xerographic drum for the purpose of obtaining therefrom a permanent xerographic print of the output on a continuous paper web transported in contact with the drum. The main advantage of such a scheme, when compared with the conventional electromechanical output printer, is the vastly higher rate of printing which is made possible by the elimination of mechanical type bars and the like. The xerographic process is in fact a form of dry photography, which combines to a great extent the advantages of the light sensitive emulsions without the complications of wet developing, fixing, and drying.

The former proposal discloses in particular how a line-up of characters may be displayed upon the screen of a cathode ray tube upon selection through the input code of pairs of electrical lines sequentially corresponding to the succession of characters displayed, and details the manner in which the line-up of characters is vertically controlled in relation to the rate of the input code and to the movement of the xerographic surface, so as to ensure parallel lines of printed output free from slanting relatively to the longitudinal axis of the paper web. It relies, in particular, on synchronizing input signals to control either the vertical stagger of the characters displayed or the speed of the drum. It does not disclose any provision for selctively controlling the location of printing vertically and horizontally or/and for printing at any drum speed independently of the incoming rate of the input code.

One object of the present invention is to provide a printer of the type as hereinbefore defined, wherein relative movement between projected characters and sensitive surface is eliminated so as to produce lines of printing at right angle to the direction of motion of said surface independently of the incoming rate of the input code.

One outstanding advantage in the realization of the above object is that the sensitive surface may be arranged to move at any desired rate to suit printing requirements and each displayed character will automatically assume the vertical positioning required for ensuring lines of printing free from slant.

A further object is to provide a printer wherein the display is controlled so as to enable any one character to be printed at any desired location upon a print receiving medium under the control of the input code or the logics of the printer.

The above object points to an essential requirement for a truly universal printer, particularly where printing upon standard forms requiring entries at a variety of horizontal and vertical locations is required.

A more particular object of the invention is to provide an improved system or print for recording alpha-numeric and similar characters which comprises a device for forming a particular standard image of such characters selected, for example, from a store of standard images each with a selected fixed arrangement of such characters, another device for forming a second image of such characters from variable arrangement of the characters generated in response to input signals, and means for projecting the standard image and the second image substantially simultaneously upon a moving light sensitive surface, the characters forming the second image being located in the appropriate position relative to the characters forming the standard image. The standard image can be, for example, a photographic image of an insurance form, and the second image can be for example, the name of the insured as well as other variable information which is to be "printed" together with the insurance form.

The invention consists therefore of a printer for recording the characters hereinbefore defined from a display thereof set up in response to coded input signals representing said characters, comprising means whereby the display is projected onto a light sensitive recording surface in motion and is so controlled as to eliminate relative movement between each projected character and said surface, whatever the rate of said motion, and independently of the incoming rate of the input signals.

The invention also consists of a printer for recording the characters hereinbefore defined from a display thereof set up in response to coded input signals representing said characters comprising means whereby the display is projected onto a light sensitive recording surface in motion and is so controlled as to eliminate relative movement between each projected character and said surface, whatever the rate of said motion and independently of the incoming rate of the input signals, and means for causing any one character to be projected at any one desired location upon said recording surface, so as to form thereon a detectable image thereof.

Preferably, the input coding is binary, the display of images is set up upon the screen of a cathode ray tube, and the light sensitive recording surface is a xerographic surface.

It must be understood, however, that other digital codings, equivalent displays and light sensitive recording surfaces may be used for the realization of the invention.

In the embodiments presently to be described, the use of a xerographic recording surface arranged upon a rotating drum will be disclosed, the display optically projected thereon forming electrostatic latent images, which after development by electroscopic powders are converted into corresponding powder images to be transferred and fixed onto a print-receiving medium, such as a web of paper, transported in contact with the drum at the same rate as the peripheral speed thereof.

The use of a xerographic endless belt instead of a drum would constitute an obvious alternative.

Similarly, the xerographic surface may be arranged as a coating to a web, such as a paper web, in which case the powder images need not be transferred to a print-receiving medium, the coated web forming in fact said medium and the powder images being fixed thereto.

A further alternative is the transfer on to a dielectric web of the electrostatic images formed on the xerographic surface, development and fixing taking place on the dielectric web.

The xerographic process is by now a well established art and no detailed description thereof is thought necessary. A brief reference will be made thereto later in the specification.

It is obvious to the skilled in the art that the xerographic surface arranged as a coating on drum, belt, or web, as indicated, could be replaced by a photographic emulsion similarly arranged.

In regard to preventing relative movement between projected characters and moving recording surface, this is preferably arranged by sensing the rate of motion of said recording surface for the purpose of deriving therefrom a rate signal effective in causing an electrical output rising linearly from a datum value with a slope finally governed by said rate, said output being operative to control the relative vertical positioning of the characters displayed, so as to cause them to be projected in a line free from slant upon the moving recording surface.

Preferably, the rate signal is fed to an integrator, the output of which is fed through an amplifier to the vertical deflection means of a cathode ray tube upon which the characters are displayed, said output being effective in controlling the vertical stagger of each character relatively to the preceding character, with the exception of the first character.

The cathode ray tube, which may be of the electrostatic or electromagnetic deflection type, is associated with a character generator capable of converting the digital output of, say, a computing device, into X and Y deflection waveforms for causing the beam of the tube to write the corresponding character upon the screen in conjunction with Z or blanking waveforms derived from either the X or Y waveforms.

The generator may be, for example, of the type described in a copending application Serial No. 753,685 filed Aug. 17, 1958, in the name of Adam Chaimowicz, now U.S. Patent No. 3,024,454 granted Mar. 6, 1962.

The character generators described in the above applications are intended for spot-sequential display of characters, wherein each character is defined by a succession of light dots, the successive positioning of each dot being determined by simultaneous X and Y deflection waveforms.

The present invention however is not intended to be limited to this type of display, an obvious alternative being the full-trace type of display.

The character generator is fed from a character selection matrix yielding a unique output line for any one combination of digital input signals, each output line representing one character and causing the generation of the corresponding X and Y deflection waveforms.

The characters are displayed upon the screen of the cathode ray tube in at least one line-up and the display is so controlled as to allow the characters to be printed at any desired transversal or longitudinal location upon the print-receiving medium, say, a paper web cooperating with a xerographic drum, both in response to coded input signals alone or in conjunction with pre-set combinations within the printer.

The location of any one character upon the print-receiving medium is defined by its horizontal printing position or horizontal recording address, and by its vertical printing position, or vertical recording address.

It is clear that the horizontal recording address is determined by the corresponding display position of the character along the line-up, or horizontal display address, and the vertical recording address by the line in which the character is printed.

One way of controlling the location of printing is achieved by recurrently generating step by step all possible horizontal display addresses and inhibiting character generation correspondingly to the recording addresses where no printing is required.

Thus assuming, for example, that it is arranged that one line of printing shall contain a maximum of 100 character positions equidistantly spaced and that the drum is allowed to rotate ⅛″ of drum circumference before one line is commenced, this being, therefore, the line-space unit, and that $\frac{1}{10}$″ is the height of a character, printing is potentially possible in approximately four lines per inch of drum circumference giving 100×4 character positions.

Horizontal location of printing is obtained by inhibiting character generation, and, therefore, display, at certain horizontal display addresses of the beam of the cathode ray tube. If, for example, it is required to indent three spaces at the beginning of a line, the beam will be allowed to go through three horizontal display addresses without a character being generated and displayed. Character generation may be inhibited for instance by feeding through the input a coded word causing selection of an unconnected line through the character selection matrix.

The vertical recording address clearly involves selection of the required line. This is achieved by preventing commencement of a line of displayed characters until a given number of line-spacing units have been counted. Thus, if it is desired to print at the middle of the fifth line, no line of characters will be allowed to commence until the fourth line-spacing has been counted and then generation will be inhibited until the beam of the cathode ray tube has reached the 50th horizontal character display address.

The horizontal display addresses may be associated with a binary register in such manner that successive states correspond to successive addresses and cause corresponding binary outputs from the register. Similarly for the vertical recording addresses.

Thus, the horizontal and vertical recording addresses of a character are each represented by the state of the corresponding register, the state 0 representing the beginning of the line, in the one case, and the first line in the other.

The output corresponding to each state of the register conforms to the binary number which the state represents. Thus assuming, for example, a register comprising seven bistable stages, the state corresponding to the binary number 0000001 will produce the following output combination on seven distinct lines: no-pulse, no-pulse, no-pulse, no-pulse, no-pulse, no-pulse, pulse, the combination identifying one definite character position.

By arranging inhibition of character generation until the output of the character address registers coincides with pre-set combinations set up for instance in similar registers, printing may be effected at any predetermined location upon the print-receiving medium.

Summing up on the broad concept of character inhibition for the purpose of controlling location of printing, two distinct provisions are included in one aspect of the invention, (a) inhibition through the coded input, (b) inhibition through pre-set combinations.

Let us assume for instance that lines of characters have to be entered at various locations upon forms. The spacing required between groups of characters forming one entry would be controlled through the coded input, independently of pre-set combinations, whereas the horizontal and vertical location of the entry upon a form would be controlled through sets of predetermined combinations.

Printing at predetermined recording addresses will hereinafter be referred to as tabulating.

One alternative to the step-by-step generation of the horizontal display addresses hereinbefore referred to consists in arranging matters so that the beam of the cathode ray tube is shifted directly to the display address called for. Assuming, for instance, that the single word "Paid" is to be entered in one line, it may be advantageous to sweep the beam directly to the display address corresponding to the horizontal recording address in which the letter P is to be printed without having to shift the beam step-wise through the display addresses preceding letter P. Once the display address corresponding to letter P is generated, the step-wise control is resumed in respect of letters *a*, *i*, and *d*. Should a further entry be required on the same line, the first horizontal display address will again be directly and the following display addresses step-wise.

The direct generations of horizontal display addresses is particularly useful when entering information upon standard forms according to a selectable range of pre-set layouts, i.e., tabulating. The direct generation may be achieved by adapting any one of a range of horizontal tabulating orders issuing from the input to cause a combination to be set up in a binary register which through digital-to-analogue conversion produces the analogues signal ensuring the X shift at the cathode ray tube corresponding to the desired display address.

The range of the horizontal tabulating orders to be accommodated is a suitable percentage of the maximum number of character positions in one line.

The facility for direct generation of the horizontal display address must clearly be extended to all possible line positions, and this is achieved by cross-connecting means, such as plug-boards, as will be explained hereinafter.

It will be appreciated that the direct generation of the horizontal display address is made possible by the inertialess nature of the electron beam of the cathode ray tube. The inertia of the xerographic drum or its counterpart prevents a similar approach in the vertical recording address generation in response to vertical address orders, since it is not possible to accelerate the drum instantaneously to the desired position. The vertical address orders, therefore, are operative only in ensuring that the required time has passed for the drum to have moved to the angular position corresponding to the line or vertical recording address in which printing is required. A plug-board arrangement similar to that associated with the horizontal display addressing may be employed.

If need be, a set of horizontal and vertical plug-boards may be included, the logics being adapted to call the pair required at any time.

The printer to which this invention is directed is intended to enable input data in the form of coded alphanumeric and other symbols to be translated into visible images to be printed on a print-receiving medium at any desired location in response to orders emanating from the input source along with the input data, or from within the logics of the printer which may be aptly referred to as an electronic printer.

In addition to vertical and horizontal address orders, there will be generally provided other orders such as Line Feed and Carriage Return Order, Figure Shift and Letter Shift Order, Stop, Blank orders, and so forth. In the description of the practical embodiments which follows the mode in which such orders are arranged will be made clear and it will be seen that many other desired orders may be accommodated along the lines disclosed.

The input to the printer may be derived directly from a computer device or through any suitable recording medium such as magnetic tape, perforated tape and the like.

Where the input is from a recording medium which must be transported past a reading head, the rate of display of characters on the cathode ray tube is tied to said medium or may be made independent of said medium.

Assuming the use of tape for both alternatives of operation, in the first case the sprocket or clock pulse rate of the tape is limited between the maximum permitted by the repetition rate of the character generator, and the minimum ensuring display of a full line of characters. In the second case, the input is read into a buffer storage at a rate which is governed by an internal clock which far exceeds the character repetition rate. From the buffer storage the information is read out by the printer and displayed.

The use of a buffer storage and internal clock enables a better utilization of the high printing speed of which the machine is capable inasmuch as variations in input rate are avoided, said input rate being raised at all times to the maximum permitted by the character repetition rate.

In short, the printer provides for the following controls and facilities in combination or in any desired and convenient selection:

(1) Printing in slant-free lines regardless of the rate at which the light sensitive surface is being moved and independently of the rate of the incoming signals constituting the input of the printer.

(2) Line-by-line printing with word spacing controlled by the input and line spacing controlled by means actuated through motion of the light sensitive surface relative to the display, for instance through photosensing marks on print medium or through a tachometer connected to the rotating drum.

(3) Tabulating, horizontally and/or vertically according to pre-set combinations in response to tabulating orders issuing from the input or from the logics of the system; if need be, said combinations being made selectable in conjunction with the particular form in use out of a selectable range of forms, if printing upon forms is adopted.

(4) Tabulating horizontally and/or vertically according to tabulating orders issuing from the input or the logics of the system and acting independently of pre-set combinations.

(5) Step-by-step generation of horizontal character display addresses combined with character inhibition to produce horizontal and vertical tabulating.

(6) Direct generation of the character display address corresponding to a horizontal tabulating address, step-by-step generation of succeeding horizontal character display addresses combined with character inhibition for vertical tabulating.

(7) Direct read in from input medium at a rate governed by the medium.

(8) Read in through buffer storage cooperating with high speed internal clock.

(9) Low speed and high speed rejection of information not conforming to pre-set tabulating combinations through (7) and (8) respectively.

Embodiments of the invention will now be described, by way of example only, with reference to the accompanying drawings, wherein:

FIG. 1 is a functional diagram of printer logics.

Figure 2:
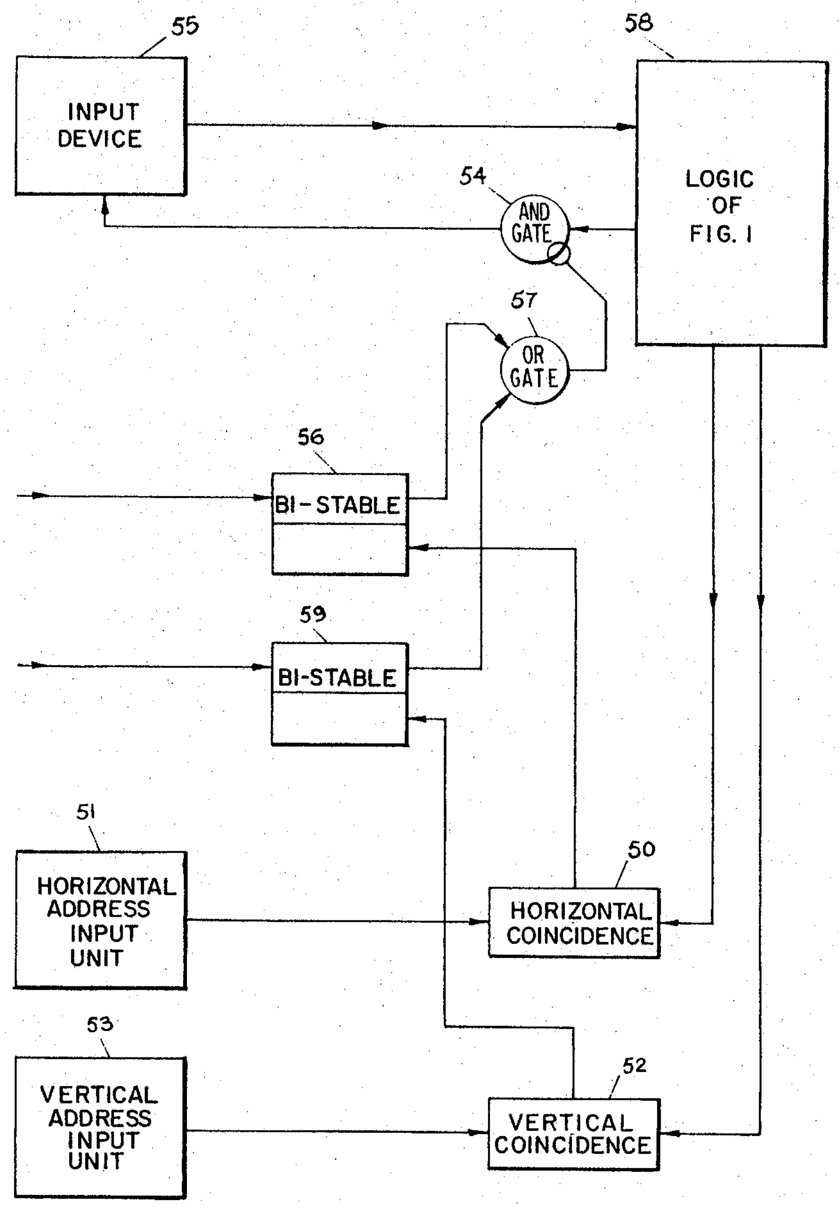
FIG. 2 is a functional diagram of a mode of tabulating control.

The arrangement referred to under FIG. 5 will be described last, since it forms as entity distinct from the actual printer logics insofar as response to coded input is concerned. Moreover, the arrangement is common to all the embodiments.

In FIG. 1, a character generator 1, for instance of the type described in either of the two above mentioned co-pending applications, is shown supplying X and Y deflection waveforms to a cathode ray tube 2, through deflection amplifiers 3 and 4, for the purpose of displaying the characters selected by the character selection matrix 5 in response to a digitally coded input on input lines 6, said input representing for instance, the output of a computing device.

The characters are formed each as a series of light dots with the aid of a sequential pulse generator 7 and are sequentially displayed in at least one line-up which is optically projected through a lens system represented at 8 on to a xerographic drum 9, the resulting electrostatic images being subsequently adapted to be developed and printed upon a print receiving medium say, a paper web (not shown), in a conventional xerographic manner.

The xerographic drum consists of a metal drum on the surface of which a photoconductor having a high dark resistivity, say, of the order of $10^{13}$ ohm-centimetre is disposed in a uniform layer of a convenient thickness, usually ranging from a few microns to about 200 microns. While unexposed, the layer is charged to a potential of a few hundred volts. Upon exposure to a pattern of light, the areas upon which light has fallen become relatively conductive and the charge thereon leaks away, the result being an electrostatic pattern or image corresponding to the light image. The electrostatic image is subsequently developed by allowing chargeable particles charged to an opposite sign to come in contact therewith, whereby said particles will adhere by electrostatic attraction only to the charged image areas. Where, as in our present case the original is a negative, i.e., the displayed characters emit light and it is desired to print a positive copy the powder is charged to the same sign as the layer and upon development is repelled by all except the image areas to which it is attached by virtue of its charge. After development the powder is transferred to a print receiving medium, for instance, the paper web referred to above, by establishing an electrostatic field transversally of paper and layer with polarity arranged so as to cause the powder to leave the layer and be attracted to the paper.

The xerographic process is amply described in United States Patent No. 2,297,691.

A horizontal display-address register is shown at 10 and a vertical recording-address register at 11. Associated in rotation with the xerographic drum is a pulse tachometer 12 feeding into a pulse counter 13.

In operation, with both registers set to zero, a line action pulse on line 14 derived from a line start signal on line 15, the origin of which will be indicated later, is routed through bistable 16 and causes a "set" pulse to be propagated through the sequential pulse generator 7 which, in the absence of inhibition, cooperates in displaying the character selected by the selection matrix 5.

The "set" pulse does, in fact, activate the sequential pulse generator to a timing set by the dot clock 17 through bistable 18. Gate 19 serves the purpose of ensuring that bistable 16 is re-set at a clock time other than that in which a "set" pulse occurs.

The dot clock, which in a convenient embodiment may be in the form of a multivibrator is also effective in setting the instant when the beam of the cathode ray tube is to be switched on coincidently with the generation of the Y deflection signal of one dot. As shown, the dot clock output is passed through a pulse shaping and gating arrangement comprising pulse delaying units 20 and 21 in addition to "and" gates 22 and 23, the output of said gates being combined in "or" gate 24. The output of gate 24 determines the actual instant when the Y deflection signal corresponding to one dot is allowed through "and" gate 25 to switch on the beam, for instance, by raising the grid of the cathode ray tube above a cut off bias potential through amplifier 26.

The X and Y deflection waveforms are available through "or" gates 27 and 28 respectively in a manner which has already been described in the copending applications referred to.

It will be noted that the Y signals are branched off through unit 42 in addition to being applied to deflection amplifier 3, so as to control the beam in the manner indicated above. Unit 42 allows an output pulse only when the input pulse is greater than a predetermined amount. This is to ensure that spurious signals are ignored.

It is assumed that the character selection matrix indicated in FIG. 1 is of the type including magnetic cores requiring a switching pulse. The switching pulse is provided in association with the first two stages of the sequential pulse generator through "or" gate 29 and amplifier 30.

The foregoing description relating to FIG. 1 indicates the manner in which a line action pulse on line 14 is operative in setting off the sequential pulse generator 7 which causes the character generator 1 to make available at gates 27 and 28 the deflection waveform corresponding to the character selected by the coded input combination fed into character selection matrix 5 on lines 6, the timing being set by dot clock 17 which also controls the timing of beam bright up.

The pulse issuing from the last stage of the sequential pulse generator, when the dot-sequential formation of a character has been completed, is fed to horizontal display-address register 10, which in the present embodiment comprises six bistable stages. Register 10, therefore, changes its state from 000000, representing the first horizontal display-address, to 000001, representing the second horizontal display-address. The output corresponding to this state is fed to a digital-to-analogue converter 31 wherein it is converted into the analogue potential which extended to the cathode ray tube through the deflection amplifier 4 produces the required horizontal shift of the beam to the second display-address.

The pulse issuing from the last stage of the sequential pulse generator is, in addition, extended through the pulse shaping device 32, monostable 33, "and" gate 34. Device 32 produces an output at the end of a pulse and monostable 33 is arranged to have a predetermined operating time. If gate 34 is uninhibited, the pulse issuing therefrom will set bistable 16 and a new pulse will be fed through to the sequential pulse generator in the same manner as if a line action signal had occurred.

It is thus clear that as long as gate 34 is uninhibited characters will be displayed sequentially. Gate 34 is, in fact, uninhibited as long as register 10 is in a state other than 000000, since the output lines of register 10 are extended to "or" gate 35 the output of which conditions "and" gate 34. The state 000000 does in fact occur at the end of a line when the register re-sets itself. The next line will not start until another line action signal is received.

Before the next line can be printed, however, a line spacing is required. This is arranged with the cooperation of pulse tachometer 12 and pulse counter 13. Tachometer 12 is adapted to generate a given number of pulses per angular displacement of the drum corresponding to the chosen line-spacing unit.

It is obvious to the skilled in the art that tachometer 12 may be replaced by an arrangement for—sensing for instance, photosensing—spaced markings on the periphery of the drum, on the print-receiving medium, or on a member in rotational relation to the drum. Alternatively, magnetic sensing may be used.

It is assumed in this embodiment that the number of pulses per line spacing is sixteen. Counter 13 is adapted to count line-spacing units, it will therefore emit one pulse per unit, i.e., a pulse every sixteen tachometer pulses. The output from counter 13, which is shown as comprising four bistable stages, provides the line start signal when unit line-spacing has been established by allowing the drum to rotate the requisite angular amount before the second line is commenced. The line start signal is applied through device 36 arranged to go off at the beginning of a pulse.

As described so far, the arrangement is capable of producing evenly spaced lines of printing, any spacing required within a line being secured by feeding the combination 000000 to the selection matrix through the coded input, this resulting, for example in the selection of an unconnected character line, such as 37, and, therefore, in no character forming signals being fed to the cathode ray tube.

Provision must obviously be included for marking off pages when printing for instance upon continuous stationery, which may be arranged as a series of business forms. This is accomplished by means of a photoelectric pick-off 39 cooperating with a light control marking on the stationery in use, which sends a re-set pulse to all registers, the marking coinciding with the end or beginning of a page or form.

Alternatively, magnetic marking and sensing may be resorted to for the same purpose.

The cathode ray tube display may be in a form of a double line-up of characters. In this case, the two line-ups are disposed one over the other and the provision for shifting from the uppermost to the lower most and vice versa is secured through the addition to register 10 of a further bistable stage 40. When the first line-up has been completed, the pulse shifting out of register 10 into bistable 40 causes the latter to apply to the cathode ray tube the shift potential required for displacing the beam to the second line-up position. The shift potential is applied through line 41 extended to Y amplifier 3. At the same time bistable 40 through gate 35 causes register 10 to go through a further cycle, with the result that the characters read out will be displayed in the lowermost line-up. The action as described of the additional stage 40 is cancelled when the latter line-up is completed, conditions being thus restored for the display of the upper line-up.

The two line-ups are intended to be projected onto the xerographic drum side by side so as to combine into a single line of characters. Compared with the single line-up, this arrangement enables a better utilization of the cathode ray tube width and of the available light output.

The provision for printing at any desired location upon the print-receiving medium in response to pre-set combinations, i.e. predetermined tabulating, will now be described.

The output pulse from counter 13, apart from providing the line start signal, causes in addition the operation of vertical recording-address register 11 which effectively counts the number of lines in the embodiment shown comprises seven bistable stages. At the end of the first line of characters said register will therefore change its state from 0000000 to 0000001 and will continue to shift one binary step at the end of each line until it resets to zero.

From each stage of both register 10 and register 11 an output line is extended, thus forming lines A and lines B. From the foregoing it is clear that the output combinations on said lines reflect at any instant a definite horizontal display address and a definite vertical recording address.

With reference to FIG. 2, lines A are fed to coincidence circuit 50 to which pre-set combinations are also fed on an identical number of lines from horizontal address input unit 51. Upon coincidence between the combination occurring on lines A and the combintaion set up in 51 a pulse is produced by coincidence 50.

Similarly for the vertical arrangement, lines B being associated with coincidence 52 and vertical address input unit 53.

Where no control in response to combinations pre-set in 51 and 53 is required—such being the case when full lines are printed with unit line-spacing—a sequential display of characters proceed in the normal manner, gate 54 being uninhibited and allowing a character code set-up timing pulse originating from the sequential pulse generator to cause the next character to be read off from the input 55.

The character code set-up timing pulse corresponds to that available on line 38 in FIG. 1.

Where control is desired a "set horizontal address" pulse is fed to bitsable 56 which via "or" gate 57 inhibits gate 54 thus preventing further character read-out until a pulse from coincidence 50 re-sets bistable 56. Similarly for the control of the vertical address, in regard of which it should be noted, however, that only multiples of the line-spacing unit may be prearranged. Unit 50 is the counterpart of 56.

In FIG. 2 block 58 represents the logics of FIG. 1.

It will be manifest to the skilled in the art that where it is intended that the tabulating order should be operative independently of pre-set combinations, units 51 and 53 need only be in the form of binary registers, the tabulating order issuing from the input including a binary number marking the address required.

In general, pre-set combinations in the manner referred to will be useful where predetermined horizontal and vertical tabulating layouts are required in conjunction with printing upon a range of standard forms. To this end, the address input units may be arranged as in FIG. 3, which is to be described with reference to the vertical addressing but is equally applicable to the horizontal addressing.

Figure 3:
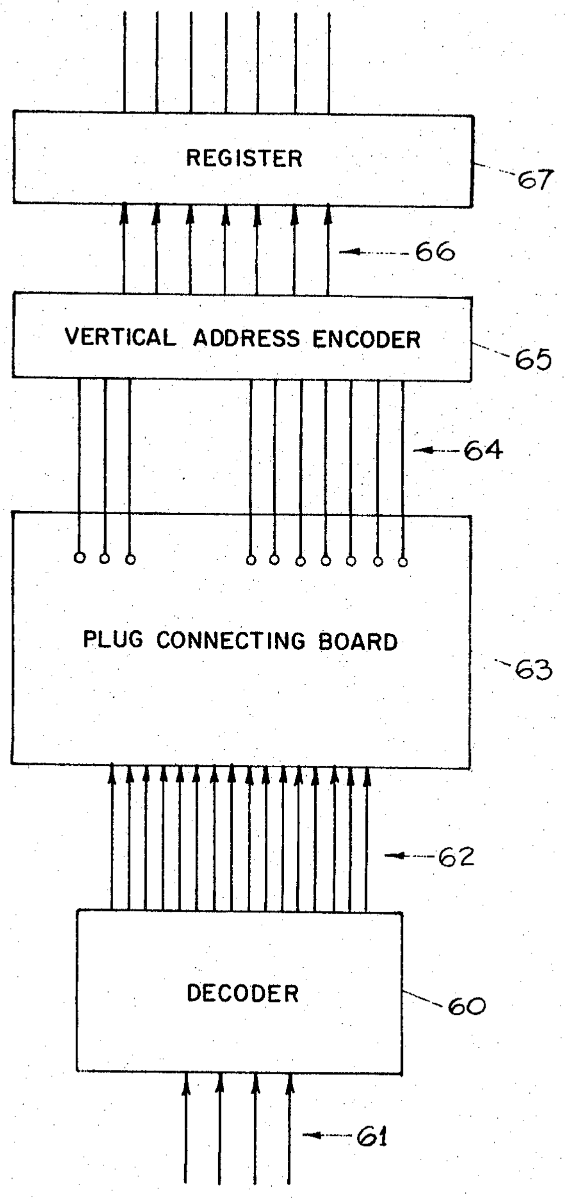
FIG. 3 is an elaboration of FIG. 2.

FIG. 3 is a detailed illustration of unit 53 in FIG. 2 which is intended to operate under the control of tabulating orders issuing, for instance, from the input along with the data to be printed. Each tabulating order will include a binary pulse combination which is extended through lines 61 to a decoder 60 providing a unique output on one line for any one input combination. In the drawing, four input lines are shown by way of example and, therefore, there will be two power four, that is sixteen output lines 62. Each unique output represents in fact a vertical tabulating order and is led to a plug connecting board 63 where it may be cross-connected to any of, say, one hundred and twenty-eight lines 64 representing as many possible print-line positions in the printed output.

Lines 64 are extended to a vertical address encoder unit 65 consisting of a matrix which produces a binary output on, say, seven lines 66, corresponding to each of lines 64 which has been activated. Thus upon activation of any one of the one hundred and twenty-eight lines in the connecting board a binary pulse combination corresponding to the line activated—that is to the print-line selected—is available at the output of the encoder. Said output is led to a register 67 in which said binary combination is set up, the output of the register being in turn extended to coincidence unit 52 in FIG. 2.

In the above layout, it is clear that, if the tabulating order causes to be activated any one of the sixteen lines in the vertical encoder unit 60 which has not been cross-connected to one of the one hundred and twenty-eight lines in the connecting board 63, no coincidence will occur in 52, it being naturally assumed that register 67 is timely re-set as will be explained later in conjunction with a detailed layout of the overall system. If no coincidence takes place, character generation is inhibited in the manner already described with reference to FIG. 2. It is manifest, therefore, that any data coming through from the input calling for an address which has not been plugged up will be ignored by the system. This means that data conforming to a certain pre-arranged tabulating layout will be printed in said layout and the remainder ignored. Thus the system is made capable of a discriminating operation which is extremely useful when the output is entered in printed forms.

A further refinement which may be incorporated is the use of a range of plugged up connecting boards selectable by the system in relation to the particular form in use. This will be made clear at a later stage.

An arrangement similar to that described with reference to FIG. 3 may be employed for the horizontal tabulating. It is however possible, in this case, to adapt the logics to a direct generation of the desired horizontal display addresses. In the logics so far described all the character addresses are generated at all times and tabulating is obtained by inhibiting where printing is not required. When entering forms, it may well happen that only a few characters are required in any one line of, say, 128 characters. It is, obviously, an advantage if it can be arranged for the cathode ray beam to ignore the unwanted horizontal display addresses and shift directly to the tabulating address which is in fact required.

Referring to FIG. 3, and relating it to horizontal tabulating, it will be appreciated that the identity of the tabulating address at any one time selected is carried by the output of the horizontal address encoder forming the counterpart of the vertical address encoder 65 shown in the figure. This output may be utilized to impulse register 10 of FIG. 1 directly to the binary combination representing the required address, as an alternative to impulsing said register serially from the end stage of the sequential pulse generator, as shown in FIG. 1. As a result, the digital-to-analogue converter such as 31 in FIG. 1 will produce at any instant the output required for deflecting the beam directly to the horizontal tabulating position called for.

It will be observed, as already indicated in the foregoing description, that in any one alpha-numeric word unit to be printed it is the position of the leading character which is directly generated in the above manner, following characters in the word unit being generated step-wise.

The horizontal tabulating selection is conveniently chosen as a percentage of the character positions in a line. In the example described with reference to FIG. 3, sixteen different tabulating positions both vertically and horizontally are allowed for. Assuming that the printed record is pre-arranged to have a maximum of one hundred and twenty-eight print-lines and as many character positions in one line, the tabulating facilities described mean that any sixteen out of the one hundred and twenty-eight lines or character positions may be pre-arranged for tabulation, the actual sixteen to be operative being chosen by the way in which the vertical and the horizontal plug boards are connected up.

Where direct generation of the horizontal tabulating address is employed in the manner described, the coincidence unit 50 of FIG. 2 may be dispensed with since the horizontal address encoder may be adapted to deliver an impulsing output signal directly to register 10 of FIG. 1 each time said encoder produces a combination as a result of a horizontal display address actually plugged up on the board being called by the input of the system. The coincidence 52 (FIG. 2), on the other hand, is still required since it is clearly necessary to wait for the drum 2 of FIG. 1 to rotate to the position called for before the actuating signal is transmitted. If the drum had no inertia, it would be theoretically possible to accelerate it instantaneously to the required vertical address by generating an analogue signal in a similar manner to that described for the vertical counterpart and utilizing said signal to shift the drum through a corresponding angle. It will be understood, therefore, that the direct generation of the horizontal tabulating addresses is made possible by the inertialess nature of the electron beam of the cathode ray tube.

The logics of a practical electronic printer layout which represents a further embodiment of the system disclosed incorporating the various features enumerated at page 10 will now be described with reference to FIG. 4.

The printer is arranged to operate on a timing dictated either by the input medium, through clock or sprocket pulses issuing therefrom, or by the printer itself through an internal clock. The first alternative will be described first.

By way of example, it is assumed that the input medium is magnetic tape with rapid stop/start characteristics, the tape bearing as many longitudinal tracks as there are bits in the digital code used, one word being represented by transversely aligned magnetic areas, one in each track. Additionally, the tape is provided with equally spaced uniformly magnetized sprocket areas each coincident with one word. The tape is passed through a reader which yields sets of data signals, each set representing one digital word and being generated coincidently with a sprocket pulse. The sprocket pulse determines the instant at which the word associated therewith may be handled. The need for this is clear when it is realized that the longitudinal tracks are to provide distinct on-or-off magnetic areas requiring a finite spacing therebetween. If a word were to be handled when a spacing occurs, there would be no data signals produced or, at best, only weak and ill-formed ones would result.

Figure 4:
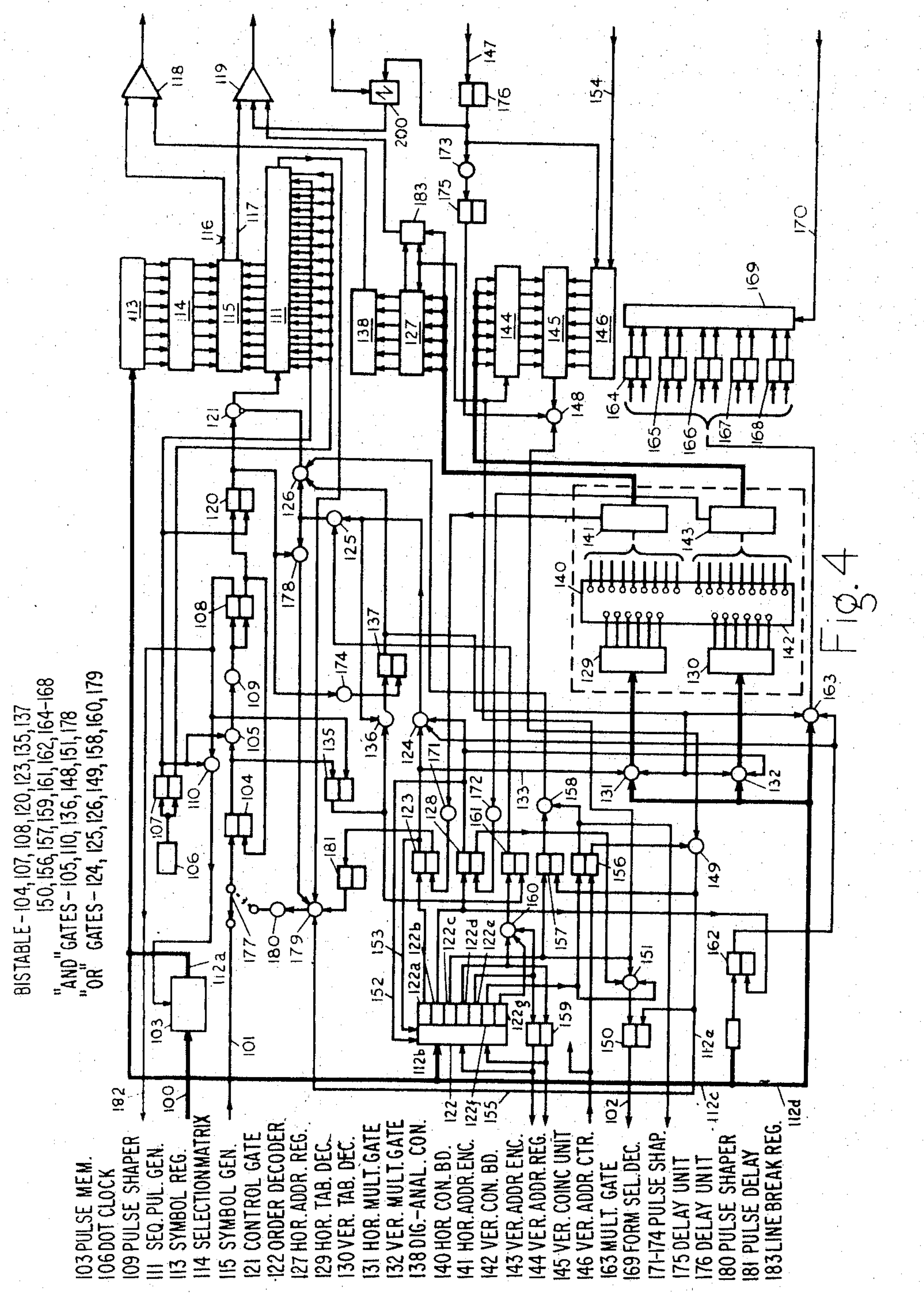
FIG. 4 is a functional diagram of further printer logics.

In FIG. 4 the data signals on, say, a six-bit code are fed into the printer on twelve lines 100 forming complementary pairs; binary nought and one to be represented on one and other line respectively of a pair. Sprocket or clock pulses are available on line 101.

In operation, the input is fed in one block at the time, each block representing the contents of one line of printing. The tape is started at the beginning of a line and stopped at the end thereof. This means that the tape dwells in between lines, but with present day equipment the dwell need not exceed a few milliseconds.

The stop-start signals supplied to the reader are made available on line 102 in a manner which will become apparent as the description proceeds. It should be noted here however that the timing of said signals is designed to take into account the fact that the tape must be in motion before it can yield data signals while, due to its inertia, it cannot instantaneously accelerate to its playback speed or stop immediately after the last word of a block has been read. Thus half an inch or so of blank tape must be allowed in between blocks.

The input data signals or pulses issuing from the reader are first read in into pulse memories 103, one word at a time, under the control of the associated sprocket pulse. The function of the pulse memories is to ensure that the input pulses actually fed to the printer conform to a timing set by the internal clock of the printer when their contents are strobed.

Pulse memories 103 may be arranged in the form of flip-flops equal in number to the digits in the code, six in the present example. Thus, upon reading in, the flip-flops will be set each to the state corresponding to the incoming bit in the digital position to which it belongs. The sprocket pulse under the control of which the reading in has taken place, is also effective in changing the state of a bistable 104 extending a pulse output to "and" gate 105 which upon being activated by a pulse issuing from dot clock 106 through bistable 107 produces an output which in turn operates bistable 108 through a pulse shaping device 109. The output of 108 activates "and" gate 110 coincidently with a pulse being applied from the dot clock. The net result of this sequence of events is that slightly after the occurrence of the sprocket pulse a strobe pulse is generated which is synchronized with the dot clock, or internal clock of the printer, synchronization being ensured by the "and" gates referred to. The strobe pulse forming the output of gate 110 is extended to pulse memories 103 for sampling the contents thereof. It is thus seen that the output of the pulse memories is the pulse combination fed in from the reader, said combination however, being made to conform to the printer timing dictated by the dot clock by which the sequential pulse generator 111 is governed for the spot-sequential character generation in the manner disclosed for instance in our copending application Ser. No. 792,128 hereinbefore referred to.

Assuming that the combination is character code, the output of the pulse memories 103 through multiple circuits 112*a* sets up character code register 113 which will thus be impulsed to the binary combination corresponding to the character read into the printer. The combination is extended to character selection matrix 114 which provides as many unique outputs as there are characters in the range for which the printer is designed. It is assumed, for the sake of example, that the binary combination set up in 113 and extended to 114 is 000001 to which corresponds character A. This means that the A character-line in selection matrix 114 will be activated and none other. All the character-lines are fed into a character generating network 115 cooperating with a sequential pulse generator in the manner described in our copending application referred to. Selection of the A character-line will therefore mean that the X and Y coordinates required for displaying the character upon the face of a cathode ray tube as sequence of light dots will be available in successive X and Y pairs at the output of 115, the dot formation timing being dictated by the dot clock 106. The X and Y signals are routed to the deflection means of the cathode ray tube through circuits 116 and 117 respectively including amplifiers 118 and 119.

The actual instant when generation and display of character A is enabled is determined by a trigger signal to the sequential pulse generator, said signal being derived from the output of bistable 108 via bistable 120 and gate 121 which is in the activated condition unless disabled.

The electronic switching so far disclosed ensures that upon receipt of a sprocket pulse the digital word associated therewith, assuming said word to be in respect of a character, is made to cause selection of the character to which it corresponds and upon selection being performed the generation and display of the character is triggered off and executed according to a timing set by the dot clock 106.

It has so far been assumed that the output of pulse memories 103 is character code and not order code relating, for instance, to tabulating order. Where the output is in fact an order, means must be provided for inhibiting the trigger signal to the sequential pulse generator. This action is in fact provided through gate 121. The ensuing description will show that said gate is disabled every time an order has been recognized by the logics of the system.

The pulse combination issuing from the pulse memories 103 upon strobing in the manner described apart from being available on multiple circuits 112*a* is also available on a parallel branch thereof 112*b* which terminates at an order decoder unit 122 providing a unique output for any one input combination. The unique outputs are made operative to execute the orders associated therewith through the logics of the system. In FIG. 4 the order decoder has been provided with seven output sections, as follows:

122*a*—Horizontal Tabulating Shift
122*b*—Vertical Tabulating Shift
122*c*—Line Feed/Carriage Return
122*d*—Figure/Letter Shift
122*e*—Letter/Figure Shift
122*f*—Stop
122*g*—Blank In order to illustrate the manner in which the system is made to discriminate between character code and order code let us assume that the binary combination which will activate the 122*a* section of unit 122 has been strobed out of the pulse memories. Since multiple circuits 112*a* and 112*b* are in parallel, the combination will be effective in setting up character code register 113 at the same time as section 122*a* is activated for the execution of a horizontal tabulating shift order. The setting up of the character code register will have no effect, however, if the gate controlling the trigger pulse to the sequential pulse generator should be disabled by the time character selection has been effected. Disabling is in fact timely brought about upon activation of the 122*a* section. The output from this section through bistable 123, "or" gate 124, "or" gate 125, and "or" gate 126 is extended to the trigger control gate 121 which is disabled, thus preventing character generation while allowing the order to be executed.

Before going on to describe the execution of orders by the logics of the system and in particular of the horizontal and vertical tabulating orders, it should be noted that in the absence of any order the printer will produce line-by-line printing with indents and word spacing produced by simply feeding 000000, or in fact any other binary combination set aside for the purpose, through the character code channel in respect of any character position where printing is not required. As in the logics described with reference to FIG. 1, the last stage of the sequential pulse generator impulses the horizontal display-address register 127 one step at the end of the generation of each character, thus shifting the horizontal printing position one step as required. As far as line-by-line printing is concerned it is thus clear that the logics of FIG. 1 and FIG. 4 are substantially similar except that FIG. 4 includes the logics for drawing information from the input.

The first major elaboration included in FIG. 4 with respect to FIG. 1 is the discrimination between character code and order code.

The description will now proceed in regard to the execution of the horizontal and vertical tabulating orders in conjunction with pre-set tabulating layouts so as to enable printing of the decoded character data according to any desired and pre-set layout as required for instance for entering information upon standard forms.

It was indicated earlier on how the output from section 122*a* is adapted to inhibit character generation. Similarly the output from the 122*b* section is routed through bistable 128, to activate the common "or" gate 124, the output of which is operative in the manner already described in connection with section 122*a*. Gate 124 is provided with a further input as shown which is also effective in inhibiting character generation. Further reference to this will be included later.

Each vertical and horizontal order comprises two words of the input code, one for character inhibition and other functions and the other for determining the tabulating address. The first word is effective through the order decoder unit 122 in the manner already indicated, and it will be noted that the character code although present at decoder 122 will not cause selection of any unique output since the order words are included in a different numerical range with respect to the character words. Both character and order codes are also extended, on multiple circuits 112*c*, to horizontal tabulating signal decoder 129 and vertical tabulating signal decoder 130. Here again only the order code is effective for the reason stated. In fact only the second word of the order is operative.

Whether the second word is to be operative in the horizontal or vertical tabulating at any one instant is determined by whether the horizontal multiple gate 131 or its vertical counterpart 132 is activated. It will be noted that the former cannot be activated unless it is first conditioned by an output from section 122*a* extended through line 133 and the latter cannot be activated unless it is conditioned by an output from section 122*b* extended through line 134. In addition, each multiple gate requires a further input to ensure correct timing and this activating input is derived through bistable 135 "and" gate 136 bistable 137, bistable 135 being set by a sprocket pulse.

Thus, upon strobing an order out of the pulse memories, the first sprocket pulse causes inhibition of character generation through the first word of the order which at the same time conditions either the horizontal or vertical multiple gate according to the nature of the order, and the second sprocket pulse activates the conditioned multiple gate through bistable 135, "and" gate 136 and bistable 137. It will be observed that "and" gate 136 is activated upon coincidence between the actuating sprocket pulse and the pulse resulting from activation of either the horizontal or vertical tabulating shift. It is therefore concerned with maintaining proper pulse timing. Each time either multiple gate is activated character inhibition is ensured through the output from bistable 137 being extended to gate 121 through "or" gate 126.

It should be noted here that unit 129 is the horizontal counterpart of unit 60 in FIG. 3 and cooperates with horizontal connecting board 140 and horizontal address encoder 141 which correspond, respectively, to units 63 and 65 in FIG. 3. Similarly for unit 130 vertical connecting board 142 and vertical address encoder 143, in respect of their counterpart in FIG. 3. The functioning of units 129, 140 and 141 on the one hand and of units 130, 142 and 143 on the other is the same as that already described with reference to FIG. 3.

The result of admitting the second word of the horizontal tabulating order to unit 129 is to set up in the digital-to-analogue converter 138 a signal proportional to the numerical value conveyed by said second word. This signal applied to the X deflection means of the cathode ray tube through line 139 causes the beam of the tube to shift directly to the horizontal tabulating position represented by the number read into unit 129.

In the vertical counterpart, the result of admitting the second word of a vertical tabulating order through multiple gate 132 is to set the vertical address register 144 to the numerical value corresponding to the line position called for. The output of register 144 is extended to coincidence unit 145 to which the output of vertical address counter 146 is also extended. Counter 146 counts the line positions as they occur and for this purpose is impulsed by a line start signal appearing on line 147, said signal being derived from the xerographic drum by any convenient means at the beginning of each line, said means being for instance an arrangement for photosensing marks or simply a tachometer geared to the drum. When coincidence exists between the vertical address counter and the vertical address register at an instant shortly after the commencement of the next line, "and" gate 148 is activated, said gate receiving one input from the coincidence unit and one from the line start signal. Activation of gate 148 causes a pulse through the normally activated "or" gate 149—the need for which will be explained later—to be extended to bistable 150 which is thus unset and sends out a start signal which starts the magnetic tape.

It is clear that while allowing the drum to rotate the angular amount corresponding to the vertical address set up in the vertical address register not only must printing be inhibited in the manner described in connection with the first word of the tabulating order, but further read out from the input must be prevented, i.e., the tape must be stopped. This is ensured by activating "and" gate 151 which sets bistable 150 and stops the tape. Gate 151 is activated, inter alia, when bistable 128 is unset. Bistable 128 is unest only when a signal appears in the vertical address encoder. There will be no signal present in the vertical address encoder as long as the input does not call for the vertical tabulating address actually plugged up in the connecting board 142.

When, upon the occurrence of the correct vertical tabulating order the vertical address encoder 143 delivers a pulse which unsets bistable 128 a stop tape signal is generated causing bistable 150 to stop the tape until the drum has gone through the correct angle, when the tape will again be started by a line start signal as described. Since the vertical tabulating shift word is arranged to cause inhibition of all orders except vertical tabulating shift through line 152, provision is actually included for allowing the input to pass information to the printer until the vertical tabulating address pre-set by means of the connecting board is called for by the input.

Horizontal tabulating is provided with a similar discriminating action, the horizontal address encoder 141 producing the unset signal for bistable 123. In this case, the need for stopping the tape does not arise since the generation of the horizontal address is instantaneous. The inhibition of all orders except horizontal tabulating orders is provided through line 153.

Since it may be desirable to allow for different page lengths in the print receiving medium, the vertical address counter 146 may be re-set by a page re-set signal on line 154 derived in any conventional manner.

The horizontal address register 127, on the other hand, would normally re-set itself on the next binary step following 111111—a six-bit code being still assumed by way of example—but an additional re-set is provided in connection with the Line Feed Carriage Return order as will be presently described.

From the foregoing description it is clear that the element which finally controls the starting and stopping of the tape system is bistable 150. It is also clear that it is not possible effectively to start the system at any random instant by manual operation, but only at the instant when coincidence is in fact occurring in unit 145. A manual signal on line 155 is thus arranged to condition "and" gate 149 through bistable 156, "and" gate 149 being activated to unset bistable 150 and give the effective start signal only upon coincidence occurring in 145. Assuming that coincidence is about to take place, the actual timing of the effective start signal is determined by the line start signal available on line 147.

The operation of the remaining orders included in sections **122*c* and 122*g* of the order decoder 122** will now be described.

Section **122*c* is reserved to the Line Feed-Carriage Return order, as already indicated. The need for this order arises where no tabulation orders are given to the system. In other words, the printing has been allowed to proceed to the end of one line and the next line is to be printed in the succeeding vertical position. It is clear that the Line Feed part of the order must be effective in stepping the vertical address register 144 one step while the Carriage Return part of the order must be simultaneously effective to re-set the horizontal address register 127 to zero as required for starting a new line. Two further requirements which must be met, also simultaneously, is to inhibit character generation and to stop the tape. For conveying the Line Feed signal a connection is provided, as shown, between section 122*c* and vertical address register 144. This connection is further extended to horizontal address register 127 since the same signal executes the Carriage Return order. The other two requirements are met as follows: character inhibition, through bistable 157, "or" gate 158, "or" gate 126, the latter inhibiting gate 121, which, as we have seen, controls the trigger pulse to the sequential pulse generator 111; stopping of the tape is achieved through connection to "or" gate 151**, the action of which has already been described.

When the above order has been executed and the drum has advanced a sufficient amount coincidence will occur in 145 as the line start signal from 145 is delivered. This signal issuing from 145 as coincidence takes place effectively starts the system as already described, and at the same time re-sets bistable 157.

Sections **122*d* and 122*e*** are reserved to Figure-to-Letter Shift and Letter-to-Figure Shift orders respectively.

The effect of these orders is to change the state of bistable 159 the output of which is extended to an additional stage—not shown—of the character code register 113. As a result the number of characters which may be selected from a given input is doubled. A five-bit code with the above shift facilities is almost equivalent to a six-bit code without said facilities. As with other orders, simultaneous inhibition of character generation is necessary, and this is arranged through "or" gate 160, bistable 161, "or" gate 125, "or" gate 126, control gate 121. Bistable 161 is re-set through bistable 135 actuated by a sprocket pulse or, as we shall see presently, from a pulse of the internal clock to be described.

Section **122*f* is provided for the execution of the Stop order. Such order must obviously fulfill only two requirements: inhibit character generation and stop the tape. The first is met through bistable 156, "or" gate 158**, "or"

gate 126, and control gate 121; the second, through "or" gate 151 and bistable 150.

Section **122*g* conveys the Blank order which allows the tape to run without any character being displayed. In the present embodiment a combination such as 000000 activates section 122*g* which simply inhibits character generation through "or" gate 160, bistable 161, "or" gate 125, "or" gate 126, and control gate 121**.

The system is in addition provided with a further order which comes into use when the variable information issuing from the tape is to be printed in superposed relation to standard information which may be selectively optically projected upon the xerographic drum. A case in point is where variable information is to be entered in any of a range of standard forms which may be stored as photographic transparencies adapted to be selectively projected onto the drum. The further order referred to is in fact a Change Form order and enables selection of the transparency at any one time required.

Similarly to the tabulation orders, the Change Form order comprises two words of the code in use. One word, effective on multiple circuits **112*d*, causes bistable 162 to be set. The output of bistable 162 is extended through "or" gate 124 to "or" gate 125, "or" gate 126, and control gate 121, and at the same time conditions multiple gate 163 which upon receiving an output from bistable 137 when the latter is impulsed by a sprocket pulse through "and" gate 136 and bistable 135 allows the second word of the Change Form order which is effective on multiple circuits 112*e* to be read through to set of bistables 164 to 168 exclusive. Said bistables store the binary coding marking the form selected. The second word of the order conveys in fact the binary number by which it has been arranged to identify a given form. The output of the bistables are sent to a form selection decoder 169**—for instance, a simple relay-tree type of decoder—which at any one time yields a unique output marking the form selected. The unique output may then be used to select the corresponding transparency.

Should the order to change form arrive half-way through the completion of a form, it is obviously necessary to inhibit the form-selection decoder 169 until an end of form signal is available on line 170 derived from the transparencies carrying member which is conveniently arranged, for instance, as a rotatable transparent cylinder illuminated from within and rotating at a speed bearing a convenient relation to the speed of the xerographic drum, selection of the transparency required being effected by selective operation of light shutters in conjunction with an opportune optical system.

Since the Change Form order would normally be associated with printing according to pre-set tabulating layouts as arranged through connecting boards 140 and 142 in the manner hereinbefore described, the re-setting pulse for bistable 162 is conveniently derived from the first vertical tabulating order following form change. Thus section **122*b* of the order decoder 122 is shown connected to bistable 162**.

The Change Form order may additionally be made to control the selection of the pair of connecting boards required for the form chosen. A switching relay may for instance be incorporated either preceding or following units 129 and 130.

A number of pulse shaping devices have been shown in the function diagram of FIG. 4. A pair of pulse shaping devices 171, 172, are shown in connection with the horizontal and vertical tabulating shift. Another 173, is shown inserted in the path of the line start signal to "and" gate 148. Still another 174 in the re-set path of bistable 137.

A number of delay units such as 175 and 176 on the line start signal circuit have also been included. Both pulse shapers and delay units do not perform logical functions but merely ensure correct handling and timing of pulses.

A line break register 183 is the counterpart of stage 40 in FIG. 3 and it is intended to enable two lines of characters spaced vertically upon the screen of the cathode ray tube to be combined in one line on the xerographic drum by a suitable optical arrangement.

In the foregoing description relating to FIG. 4 it has been assumed that the system is controlled through the sprocket pulses issuing from the input medium, which, by way of example, has been given as magnetic tape. This entails upper and lower limits of reading-in rate. The tape must be neither faster than the repetition rate of the character generator allows nor slower than the minimum which will permit a line full of characters to be displayed.

The system illustrated in FIG. 4 actually includes provision for a further mode of operation selectable by throwing switch 177 over to the position shown in dotted line. This second alternative is based on the action of an internal pulse clock represented by elements 104, 105, 109, 108, 120, "and" gate 178 "or" gate 179, pulse shaper 180 which form a closed loop. The internal clock is used in conjunction with an input buffer storage (not shown) in which the signals from the tape are read in and from which they can be read out in an "on demand" fashion, thus allowing a great volume of information not conforming to predetermined tabulating layout to be rejected rapidly, in fact at a rate far exceeding the repetition rate of the character generator.

The internal clock is arranged to be pulsed into action under the following circumstances: (a) when a line-start signal is given; (b) when the horizontal tabulating shift bistable 123 is re-set; (c) at the end of one cycle of the sequential pulse generator where character generation has not been inhibited. The initiating pulse, whatever the origin thereof is delivered through "or" gate 179 and the connections are clearly shown in the diagram. The initiating pulse originating from bistable 123 passes through a pulse delay device 181. Whether the clock will go through repetitive cycles or not, is determined by "and" gate 178 which is adapted to be activated through "or" gate 125 when any one of sections **122*a*, 122*b*, 122*d*, 122*e*, 122*g* or change form orders are operative. "And" gate 178 controls the break in the closed loop referred to. When the loop is broken a further initiating pulse through 179** is required to activate the internal clock.

In general the loop will not be broken when information is being rejected because it does not conform to predetermined tabulating layouts. In fact, as long as this condition persists bistables 123 and 128 will not be re-set from the horizontal and vertical address encoder respectively, gate 125 is activated, which in turn maintains loop controlling gate 178 operative.

The repetitive rate of the loop obviously determines the speed at which the information is being rejected, and this can be made quite high—say 50 kc. for a 5-kc. character speed.

At each cycle of the loop a store read action pulse must be produced therefrom. In FIG. 4, said pulse is the output of bistable 108 and is available on line 182. Its action is to cause a set of pulses to be generated from the input buffer storage which will be read into the pulse memories 103 and handled by the system in the manner already described.

Here is a summary of the actual sequence of operations. A pulse from gate 149 representing a line start causes gate 179 to deliver an initiating pulse to the clock. After a short delay determined by the time constants of the clock elements a store read action pulse will be available on line 182 to read out from buffer store into pulse memories 103. After a further delay, a digit strobe pulse will issue from gate 110 to sample the pulse memories and to set up character code register 113, as already indicated in the foregoing description. After a still further delay, bistable 120 will produce an input pulse activating gate 121 which triggers the sequential pulse generator 111 into action and causes the display of the character stored in register 113. If the input is order code instead of character code, one of the sections of the order decoder 122 is activated, or the change form order is operative. Out of the decoder sections shown in FIG. 4 the Line Feed Carriage Return section 122*c* and the Stop section 122*f* must obviously be arranged to cause character inhibition but no further read out; they are therefore effective in inhibiting the gate to the sequential pulse generator but have no action on the loop control gate 178. As regards the Stop order, the reason for this is obvious. As regards the Line Feed Carriage Return order, the reason is that the reading in of the next block of information must be initiated by a line start signal. On the other hand, sections 122*a* and 122*b* must both be allowed to initiate the clock as soon as the correct tabulating orders have been recognized, while sections 122*d* and 122*g* involve an initiation pulse directly upon activation thereof. These latter three sections therefore cooperate with a communal "or" gate 160.

At this stage the logics of the gating arrangements shown can be clearly understod by the skilled in the art. It will be observed in particular the separate function of gate 125 enabling loop closing pulses to be delivered to gate 178 from decoder sections involving said pulses, and of gate 126 which groups together the action of character inhibition pulses only, which are effective in disabling gate 121.

The loop hereinbefore referred to need not be necessarily arranged as shown, there being alternative ways of producing the clock pulses with the required timing. The essential fact is that as far as read out is concerned the system has been provided with both high read out rate, through the internal clock, or low read out rate under the control of the sprocket pulses which may be taken as constituting an external clock.

The foregoing description of the embodiment illustrated in FIG. 4 clearly indicates that a system has been devised which accepts both coded alpha-numeric data and coded orders, and discriminates between them in the sense that alpha-numeric data is displayed successively unless an order is received, whereupon character generation is inhibited, the order executed, and further read out from store effected.

The arrangement described in FIG 5, which as indicated earlier on is common to all foregoing embodiments, will now be described.

Figure 5:
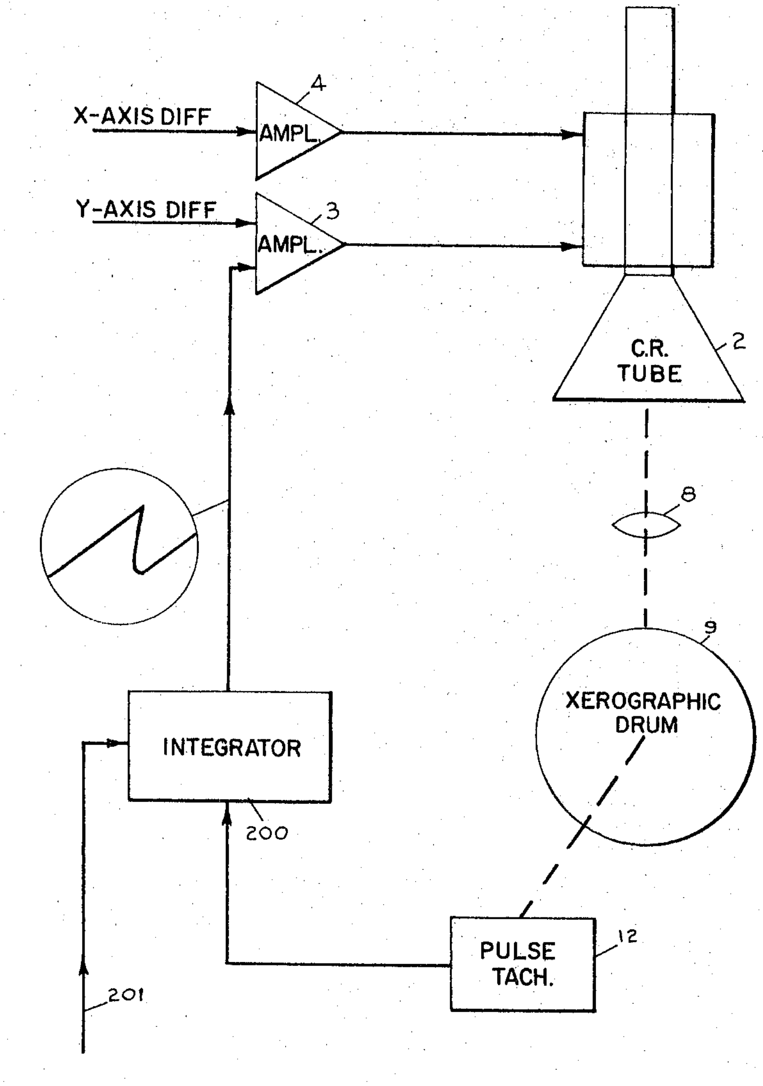
FIG. 5 is a functional diagram of the arrangement for controlling the vertical display position of successive characters to ensure slant-free lines of printing.

For a clearer understanding like parts have been given like references in FIGURES 1 and 5. Thus a xerographic drum 9 is shown in spaced relation with a cathode ray tube 2, the deflection means of which are supplied with X and Y deflection waveforms fed through amplifiers 4 and 3. The deflection means, as in any other embodiment, may be of the electrostatic or electromagnetic type.

The display of characters on the screen of the cathode ray tube is adapted to be projected upon the drum through a lens system indicated diagrammatically at 8. The drum is geared to a tachometer 12.

Assume that a line-up of characters displayed on the screen is to be projected onto the surface of the drum in a line parallel to the axis of rotation of the drum. Upon the occurrence of a line start signal as described with reference to FIG 1 and FIG. 4, the first character in the line is displayed and an electrostatic image thereof formed at a certain location upon the drum surface. The remaining characters will likewise be displayed and projected, but owing to the finite time required for the display, the drum will have moved a certain angular amount by the time each successive character is displayed. Unless counteracted by a Y shift of the cathode ray tube, this relative movement between displayed character and drum would result in a line of characters being printed askew instead of at right angle to the direction of motion of the print receiving medium, say, a paper web transported from one feed to one take up roller.

The means for counteracting said relative movement according to FIG. 5 consists in feeding a rate signal derived from tachometer 12 into an integrator 200—see also FIG. 4—giving an output rising linearly from a datum value to a maximum, which is reached after a given number of tachometer pulses have occurred, with a slope ultimately governed by the rate at which these pulses are forthcoming. After the maximum has been reached the output is adapted to fall back to the datum level very rapidly in saw-tooth fashion. The integrator output is fed to the Y deflection means of the cathode ray tube through Y amplifier 3.

Integrator 200 is adapted to be controlled by the line start signal on line 201, the derivation of which has already been indicated in the foregoing description.

In operation, when a line start signal is fed to the integrator the first character of a line-up is displayed. The first character obviously involves no Y shift and, therefore, it is made to correspond to the point where the integrator output is about to rise from the datum level. By the time the second character is displayed, the drum will have moved by a very small amount and Y shift is therefore required proportional to the rate of the movement. Similarly in respect of subsequent characters in the line-up, until the last character is displayed whereupon maximum Y shift is required. It is seen therefore that said shift is effective in a number of steps which must be equal to the maximum number of characters in a line-up, the height of each step being proportional to the rate at which they occur.

The tachometer is, therefore, adapted to yield a number of pulses equal to the maximum number of characters in the line-up per angular movement of the drum corresponding to the height of one character.

Having arranged matters so that the integrator output provides the required correction at a given speed, the correction will increase or decrease in step with a similar variation of drum speed.

It will be observed that the arrangement is independent of the incoming rate of input signals. In fact, it is independent of the rate at which characters are displayed upon the screen. Whether the rate of display is high or low, as long as characters appear on the screen they will be printed in slant-free fashion at any drum speed.

The speed of the drum may be easily controlled in relation to printing requirements thus lending considerable versatility to the printer as a whole.

The foregoing description relating to both the embodiments of FIG. 1 and FIG. 4 clearly indicates that the logics of the electronic printer allow characters to be posted or addressed independently of the input signals which identify them. In fact the only function of the character code, or display producing signals, is to select a circuit which activates the generation of the corresponding character. The character code in no way affects the position in which a character is to be printed nor in fact the timing.

Reverting for instance to the embodiment of FIG. 1 and examining the condition obtaining in line-by-line printing with word spacing controlled through a predetermined input word set aside for this purpose, it will be observed that the opposite or display address of successive characters is generated through the action of a pulse emerging from the last stage of the sequential pulse generator, which pulse shifts the horizontal address register one binary step, while the sequential pulse generator is triggered into a further cycle unless character inhibition is operative, the further cycle causing at the end thereof the generation of a successive horizontal address. Thus each successive horizontal display position with the exception of the first position in a line—which corresponds to rest conditions—is determined by a device which is timed independently of the character signals. In fact, the sequential pulse generator sets the instant when a character may be accepted from the input through character code set up timing. This means that the maximum rate at which characters may be displayed is set by the character repetition rate and not by the rate at which character signals are forthcoming.

Similarly when tabulating facilities as described are made use of. The tabulating orders are in fact operative only in determining the horizontal and vertical address of the first character in a group of characters, the horizontal address of following characters being generated as before through the step-wise action caused by the sequential pulse generator independently of the input character code.

It should be further observed in relation to FIG. 4 wherein means are included for discriminating between character code and order code, that said means are interposed only between the input and the means for determining the position where given items are to be printed. In the example shown the discriminating means is provided by the order decoder. There is not included any such means between the input and the character generator. So much so that in fact any input word whether character code or order code is read into the character generator but is not effective if the order decoder has recognized such word as an order code.

In the foregoing description a number of well known devices have been referred to. Most of these have been described in detail in, "Digital Computer Components and Circuits," by R. K. Richards, published by Van Nostrand and printed in the United States of America. Thus the bistables referred to are of the type as for instance described from page 160; similarly, page 57 in respect of decoders and encoders; page 38, for gates; page 171 for monostables, page 486 for the integrator.

As regards the sequential pulse generator, this may be arranged as a series of flip-flops wherein each stage with the exception of the first is pulsed into action by the preceding stage. A more elaborate arrangement particularly suitable for the realization of the invention is that disclosed in British Patent No. 766,987.

I claim:

1. In a system for recording a first character array composed of one or more lines of variable characters in superposed relation upon a second character array composed of a plurality of lines of a fixed arrangement of such characters for subsequent printing out of the characters of both arrays in their proper relative positions, the combination comprising, means providing a signal input character code characteristic of the variable characters desired to be recorded, a character generator controlled by said input character code for producing the desired characters in code form and in a sequential manner, means connected to the output of said character generator for converting the code form of said sequentially produced variable characters into one or more line images in a line-by-line manner in accordance with the signal input character code, means establishing said second character array as a standard image and projecting the same in a line by line manner onto a light-sensitive surface which moves in a direction transverse to the direction of the projected lines of characters of said second character display, means for also projecting the line images of said variable characters of said first character display in a line-by-line manner onto said moving light-sensitive surface in the same transverse direction as said character lines of said second character display are projected, means establishing vertical and horizontal recording addresses and means actuated by said vertical and horizontal recording addresses for controlling respectively the production of said line images of said variable characters and the horizontal position of the characters on the line such that said line images will be superimposed according to a predetermined layout upon the projected line images of said second character display.

2. A recording system as defined in claim 1 and which further includes means establishing a store of different standard image forms, means establishing a change form order code, and means controlled by said change order form code for selecting a particular one of said standard image forms from said store for projection onto said moving light-sensitive surface.

3. A recording system as defined in claim 2 and which further includes means providing sets of predetermined tabulating signal combinations corresponding respectively to each standard image form, said signal combinations serving to effect removal of the desired standard image form from said store and in turn being selected by said change form order code.

4. A recording system as defined in claim 1 wherein said means for converting the code form of said variable characters produced by said character generator into one or more line images for projection onto said moving light-sensitive surface is constituted by a cathode ray tube having X and Y axes beam deflecting means for creating the character on the screen of the tube.

5. A recording system as defined in claim 4 and which further includes means for deflecting the characters produced on the screen of said tube by a signal independent of the incoming rate of the signal input code but which is proportional to the distance travelled by said light-sensitive surface so as to maintain the line of sequentially produced variable characters projected onto said moving light-sensitive surface transverse to the direction of movement.

6. A recording system as defined in claim 5 wherein said signal for deflecting said characters comprises a signal having a saw-tooth wave form applied to the Y-deflection axis of said tube to compensate for the line slant that would otherwise be produced at said moving light-sensitive surface.

7. A recording system as defined in claim 4 wherein said variable characters displayed on the screen of said cathode ray tube are composed of a succession of light dots and wherein the simultaneous X and Y axis deflection wave forms required at said tube are gated to said tube directly upon generation caused by a sequential pulse generator.

8. A recording system as defined in claim 1 wherein said moving light-sensitive surface onto which said images of said first and second character displays are simultaneously projected in a line-by-line manner is constituted by a xerographic recording surface.

9. A recording system as defined in claim 1 wherein said signal input character code is established on a recording medium such as magnetic or perforated tape, the signals being fed into the system at a rate controlled by signals issuing from said recording medium.

10. A recording system as defined in claim 1 including means deriving said input signal code via a recording medium via a buffer store, said signals being read out of said store into the system and being controlled by a timing set by the system.

References Cited by the Examiner

UNITED STATES PATENTS

| | | | |
|---|---|---|---|
| 2,648,723 | 8/1953 | Goldsmith | 340—149 |
| 2,785,388 | 3/1957 | McWhirter et al. | 340—149 |
| 3,187,094 | 6/1965 | Giles | 178—6.8 |

NEIL C. READ, *Primary Examiner.*

T. A. ROBINSON, *Assistant Examiner.*